(12) United States Patent
Zolotov

(10) Patent No.: US 6,718,023 B1
(45) Date of Patent: Apr. 6, 2004

(54) METHOD AND SYSTEM FOR CREATING REAL TIME INTEGRATED CALL DETAILS RECORD (CDR) DATABASES IN MANAGEMENT SYSTEMS OF TELECOMMUNICATION NETWORKS

(75) Inventor: Moshe Zolotov, Tel-Aviv (IL)

(73) Assignee: Ectel Ltd., Petach Tikva (IL)

( * ) Notice: Subject to any disclaimer, the term of this patent is extended or adjusted under 35 U.S.C. 154(b) by 0 days.

(21) Appl. No.: 09/613,462

(22) Filed: Jul. 10, 2000

(30) Foreign Application Priority Data

Jul. 12, 1999 (IL) .................................................. 130893

(51) Int. Cl.[7] .......................................... H04M 15/00
(52) U.S. Cl. ...................................... 379/133; 379/126
(58) Field of Search ........................... 379/112.01, 133, 379/114.01, 32.01, 111, 126, 229, 230

(56) References Cited

U.S. PATENT DOCUMENTS

| | | | |
|---|---|---|---|
| 5,008,929 A | 4/1991 | Olsen et al. ................ 379/112 |
| 5,517,555 A | 5/1996 | Amadon et al. | |
| 5,539,804 A | 7/1996 | Hong et al. | |
| 5,606,600 A | 2/1997 | Elliott et al. ................ 379/112 |
| 5,732,127 A | * 3/1998 | Hayes ................... 379/114.01 |
| 5,793,853 A | 8/1998 | Sbisa | |
| 5,815,559 A | 9/1998 | Schnable | |
| 6,052,447 A | 4/2000 | Golden et al. | |
| 6,249,572 B1 | * 6/2001 | Brockman et al. .......... 379/133 |
| 6,304,640 B1 | 10/2001 | Darland et al. | |
| 6,327,350 B1 | * 12/2001 | Spangler et al. ....... 379/115.01 |
| 6,381,306 B1 | * 4/2002 | Lawson et al. ........ 379/112.01 |
| 6,400,813 B1 | * 6/2002 | Birnhak ...................... 370/244 |
| 6,411,681 B1 | * 6/2002 | Nolting et al. ............. 379/1.01 |
| 2002/0122544 A1 | * 9/2002 | Williams et al. ....... 379/207.02 |

OTHER PUBLICATIONS

"ECI Telecom Receives Orders Worth $17.5 Million for DCME Sprint orders $10 Million of DTX–360", ECI Telecom—Press Release, Jan. 6, 1997, Found on Internet—http://www.ecitele.com/r3606.htm.*

"ECI Telecom's Fully Owned Subsidiary, ECtel, to Supply its TRP–360 Quality of Service Solution, QualiView, to Deutsche Telekom", ECI Press Release, Jan. 4, 1998, Found on Internet.*

"TRP–360 Hardware", ECI TRP–360 hardware description, date unknown, found on ECI web page.*

74643039, USPTO Trademark Registration for "Qualiview" filed Mar. 6, 1995.

* cited by examiner

Primary Examiner—Huyen Le
Assistant Examiner—Barry W Taylor
(74) Attorney, Agent, or Firm—Nath & Associates PLLC; Harold L. Novick; Marvin C. Berkowitz

(57) ABSTRACT

A method and a system for building an Integrated Call Detail Records data base in a telecommunications network in real time, by collecting call related events concerning a particular call from two or more data sources by at least one suitable probe, merging the call related events and recording the merged events with respect to each particular call in real time using computerized means associated with the probe (s). The data sources may be mixed, i.e. comprising at least one bearer data source and at least one signaling data source; however, they may be sources of signaling data only. The sources of information may be situated at different interface points of the communication network.

20 Claims, 10 Drawing Sheets

METHOD AND SYSTEM FOR CREATING REAL TIME INTEGRATED CALL DETAILS RECORD (CDR) DATABASES IN MANAGEMENT SYSTEMS OF TELECOMMUNICATION NETWORKS

FIELD OF THE INVENTION

The present invention relates to a method and a system for creating Call Detail Records databases (CDRs) in management systems of modern telecommunications networks. There is a co-pending US patent application claiming priority from an Israeli patent application No. 130894 filed Jul. 12, 1999.

BACKGROUND OF THE INVENTION

Collecting information on calls in real time and building the so-called CDRs is required for the functioning of management systems in modem telecommunications networks, such as a billing management system, a fraud management system, a service management system, a quality of service management system or the like.

It is becoming more and more complicated to manage telecommunications networks in today's communication environment due to the increasing interconnectivity between networks of different type and owing to the appearance of additional types of Network Elements (NE) providing transport bearer and signaling capabilities. The term "bearer" should be understood as voice, fax or data signals to be transported through the network, while the term "signaling" covers service information transmitted in so-called signaling networks for proper handling the appropriate bearer.

A single call instance (voice, fax, etc.) may span a number of various networks and be handled by several types of Network Elements, as well as the signaling data on the call can be delivered via several different signaling protocols (e.g., an Intelligent Network call, a GSM call, etc.).

The management systems presently in use incorporate CDRs built in such a way that one source of information (say, a particular Network Element or a particular signaling system) is used for creating one CDR data base.

U.S. Pat. No. 5,606,600 describes processing of data, incorporated in call detail records (CDR) obtained from network switches, by a statistics engine. A so-called network information concentrator is introduced which collects, at a single point, call records from various network elements. This enables the concentrator to create data buffers of CDRs that are input to the statistics engine for processing. It is not described, however, how the call records are collected from different network elements, which information sources are used and how the data is integrated.

U.S. Pat. No. 5,008,929 describes a billing system for use in a telephone signaling network. The network includes signal transfer points (STPs) for receiving and routing message signaling units (MSUs), and a plurality of service control points (SCPs) linked to corresponding STPs. Each SCP comprises a database that includes call data provided by one or more telephone companies participating in the network. The billing system comprises means for capturing at least a portion of the MSUs received by one or more STPs and processes thereof to produce usage data that indicates service recipients and service providers. The described system, however, concerns only the signaling information in the signaling network and is intended for billing only. The description fails to explain how data bases of different SCPs are integrated (combined).

SUMMARY OF THE INVENTION

It is therefore the object of the present invention to provide a novel method and an appropriate system for building CDR data bases useful for management systems in telecommunications networks.

The above object can be achieved by providing a method for building an Integrated Call Detail Records data base in a telecommunications network in real time, comprising steps of:
  collecting input information concerning a particular call from two or more data sources, said input information comprising call related events;
  merging said call related events and recording the merged events concerning the particular call in real time, thereby forming the real time Integrated Call Detail Records data base.

The Integrated Call Detail Records data base (Integrated CDR) should be understood as a CDR data base of a high level management system in a telecommunication network, such as a Billing Collector, a Billing System, a Fraud Management System, a System for Quality of Service Management, and especially those managing combined networks which comprise different domains such as PSTN (plane service telephone network), Voice over IP and/or others. The high level management systems of interest are those operating with information layers which cannot be obtained at one source and usually,—even at one network domain of a combined network.

In accordance with one particular version of the method, all said data sources are sources of signaling data.

Such management systems as a Network Management center, applications of signaling system SS7, Billing Collector or other Billing assistance systems, Roaming manager can use Integrated CDRs built using sources of signaling data only. For example, an Integrated CDRs of a Billing assistance system may incorporate data on pre-paid calls for a particular customer and provide real-time update of the remaining credit by registering signaling data on calls which the customer effects over each and every part of the network of interest.

Alternatively, the method may be accomplished if at least one of said data sources is a bearer (such as voice, fax or data), and at least one of said data sources is a source of signaling data associated with said bearer. It should be understood that the data source being a bearer is actually a source of call related events extractable from the bearer, e.g., the bearer classification, DTMF, any Quality of Service parameters, etc.

According to a preferred version of the method, said at least two sources of information are situated at different Interface Points of the communication network, said interface points being understood as located on links connecting network elements (NE) to one another.

Depending on the kind of network and its elements, the link, may carry a bearer (e.g., voice, fax, data), a combination of a bearer and in-band signaling, or out-of-band signaling.

For example, said at least two data sources may comprise a bearer signal and a signaling data, for example both originating from a communication link carrying both the bearer and its in-band signaling. However, the two data sources may comprise a bearer signal and a signaling data which is obtained from any appropriate in-band or out-of band signaling source.

In the version of the method, where the two data sources are both signaling data sources, they might constitute:

an in-band signaling (taking place over a communication link serving for transmitting the bearer), and an out-of-band signaling, for example created by a signaling network SS#7;

both signaling sources may be out-of-band signaling sources with different protocols, both signaling sources may be in-band signaling from different interface points.

It should be noted, that the telecommunications network may comprise a number of component networks, such as a Telephony Network, an Access Network and an IP Network. The mentioned sources of information may therefore be situated at different said component networks, i.e., at a number of Interface Points distributed in more than one said component networks.

The method can preferably be performed by utilizing at least one probe (such as Front End System FES probe) capable of non-intrusive collecting said input information from at least one data source, but preferably from two or more data sources, and a computerized means comprising a Central Computer (CC) connected to said FES and provided with appropriate hardware and software modules.

In the described method, the step of collecting the input information preferably comprises picking out the call related events (so-called Pre-CDRs) therefrom. The picking out can be accomplished as follows:

processing the input information by a plurality of Interface Handlers (IH), capable of handling a variety of interfaces mapped to different links in the telecommunications network (which, in turn, may include a number of component networks and signaling networks);

applying a plurality of Protocol Parsers (PP) capable of handling a variety of protocols, wherein each said Protocol Parser handles a single protocol type.

Optionally, the method may comprise a step of storing the separated call related events (Pre-CDRs) for further processing.

In view of the above, the method can be accomplished in the following order:

collecting said input information by each of the probes, picking out call related events (or Pre-CDR events) by performing initial processing of the collected input information using said IH and PP;

merging said call related events by said computerized means and recording the merged call related events in the Integrated CDR data base with respect to a particular call.

Preferably, the step of merging and recording is performed in two stages:

a) forming one or more CDR databases, using for each of said CDR databases the call related events (so-called Pre-CDR events) associated with one telecommunications protocol, b) forming an Integrated CDR from said one or more CDRs obtained at step (a) and all remaining call related events (Pre-CDR events) associated with the same particular call.

Finally, steps (a) and (b) in the above-mentioned version of the method can be performed by generating said CDRs and Integrated CDRs from said Pre-CDRs by a CDR builder, based on pre-defined rules; said rules being stored in correlation tables in the memory of the computerized means.

The rules indicate to the CDR Builder which events should be introduced into the final Integrated CDR and determine the association or linkage between different call events. Such associations may include one or more of the following parameters related to a call: origin and destination identifications mapped to a relevant communication/application layer, time stamp, link/trunk ID, bearer type, and other identities.

According to a second aspect of the invention, there is provided a system for building an Integrated Call Detail Records data base in a telecommunications network in real time, comprising at least one probe capable of collecting input information, concerning a particular call, from two or more data sources and capable of picking out call related events from said input information;

computerized means connected to said at least one probe and adapted to merge said call related events and record the merged events concerning the particular call in real time, thereby creating the Integrated Call Detail Records data base.

According to the preferred embodiment of the system, all said data sources are sources of signaling data, handling said particular call.

In an alternative embodiment, at least one of said data sources is a bearer (such as voice, fax or data), and at least one of said data sources is a source of signaling data (in-band or out-of band) associated with said call.

The mentioned at least two sources of information may be situated at different Interface Points of the communication network, i.e. on links connecting network elements (NE) to one another. Depending on the kind of network and its elements, the link may carry a bearer (e.g., voice, fax, data), a combination of bearer and in-band signaling, or out-of-band signaling.

It should be noted, that the telecommunications network may comprise a number of component networks, such as a Telephony Network, an Access Network and an IP Network. The mentioned sources of information may therefore be situated at different said component networks, i.e., at a number of Interface Points distributed in more than one said component networks.

According to the most preferred embodiment of the system, said probe is a Front End System (FES) probe capable of non-intrusive collecting said input information from at least one data source, but preferably from two or more data sources. It is therefore understood, that the system may comprise more than one said probes.

The above-mentioned probes are preferably similar to the Front End System probes TRP-360 of ECTel® Ltd., Israel.

Each of the FES Probes is adapted to collect the input information (signaling and/or bearer), and to perform initial processing of this information for picking out so-called call related events (or Pre-CDR events) which are entered to the computerized means for further processing. The computerized means may comprise a Central Computer (CC) connected to said one or more FES probes. The CC in cooperation with said FES Probes is capable of merging said call related events and recording thereof in the integrated CDR data base with respect to particular calls.

Preferably, the Central Computer is operative to effect a two-step processing of the call related events (Pre-CDRs) received from the Front End System Probes:

a) forming one or more CDR databases, using for each of said CDR databases the call related events (so-called Pre-CDR events) associated with one telecommunications protocol, b) forming an Integrated CDR from said one or more CDRs obtained at step (a) and all remaining call related events (Pre-CDR events) associated with the same particular call.

According to one particular embodiment of the system, the computer means comprising the central computer CC cooperating with the FES probes includes a processor and a memory means provided with the following hardware and software modules (which can be distributed in any selected manner between said FES probes and the CC):

a plurality of Interface Handlers (IH), capable of handling a variety of interfaces mapped to different links in the telecommunications network (which, in turn, may include a number of component networks);

a plurality of Protocol Parsers (PP) capable of processing a variety of signaling protocols interfaced by the Front End System Probes, wherein each said Protocol Parser handles a single protocol type;

said IH and PP being capable of processing the input information obtained form one or more Interface Points and producing comprehensive Pre-CDRs (said call related events) which might be stored for a later processing;

a CDR builder provided with correlation tables and capable of generating CDRs and Integrated CDRs from said Pre-CDRs, based on pre-defined rules stored in the correlation tables.

The rules indicate to the CDR Builder which events should be introduced into the final Integrated CDR.

The pre-defined rules determine the association or linkage between different call events. Such associations include one or more of the following parameters related to a call: origin and destination ID/numbers, time stamp, link/trunk ID, bearer type, other identities.

BRIEF DESCRIPTION OF THE DRAWINGS

The invention will be further described using a number of embodiments with reference to the following non-limiting drawings in which.

DETAILED DESCRIPTION OF THE PREFERRED EMBODIMENTS

Figure 1:
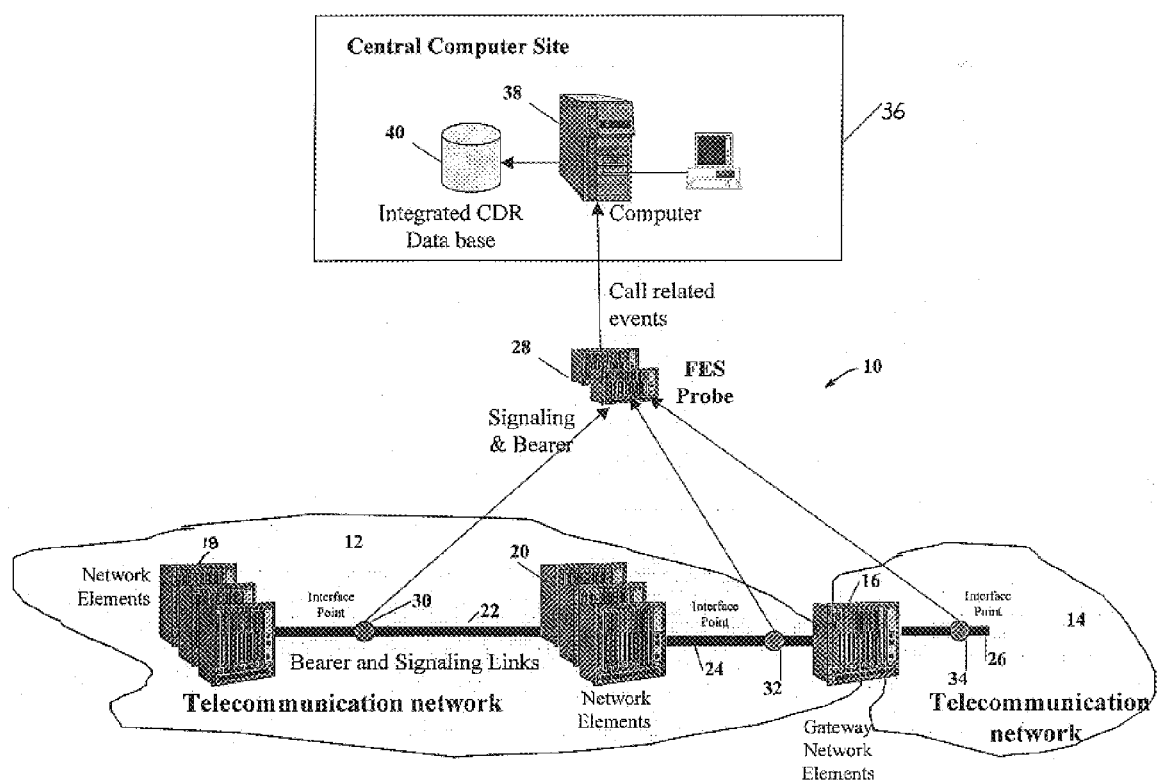
FIG. 1 is pictorial representation showing a system for building integrated CDRs according to the invention, the system uses two or more sources of data related to a call, including bearer signal sources.

FIG. 1 schematically illustrates a system 10 for building integrated CDRs according to the inventive method. In the drawing, two telecommunications networks 12 and 14 are shown, which are interconnected by a Gateway network elements schematically marked 16. In the combined telecommunication network, telecommunication links transmit both the bearer, and signaling (in-band and out-of-band). The network 12, which may be a conventional telephone network such as PSTN, comprises network elements (NE) 18 and 20. Suppose that links 22 created at this part of the network are links transmitting the bearer together with the in-band signaling. Other links (24, 26) shown in the drawing may be intended for transmitting a bearer only. Let a call instance (i.e., any bearer such as voice, fax or data) passes via both networks 12 and 14 through links 22, 24 and 26. One or more probes 28 (for example Front End System Probes) are connected to three Interface Points 30, 32, 34, i.e., interfaced to three links 22, 24 and 26, respectively, for obtaining input information therefrom. The input information is thus received from a number of different data sources, i.e., from two sources (a bearer source and a signaling source) found on the link 22 and at least from two additional data sources found in two links 24 and 26. The group of FES 28 (which may comprise one FES) performs initial processing of the input information and transmits results of the processing to a central computer site 36 in the form of Call related events. The call related events are processed by a central computer 38 to merge the Call related events. In the simplest case, an Integrated Call Details Record (CDR) data base 40 is created by recording the merged Call related events on storing means.

Figure 2:
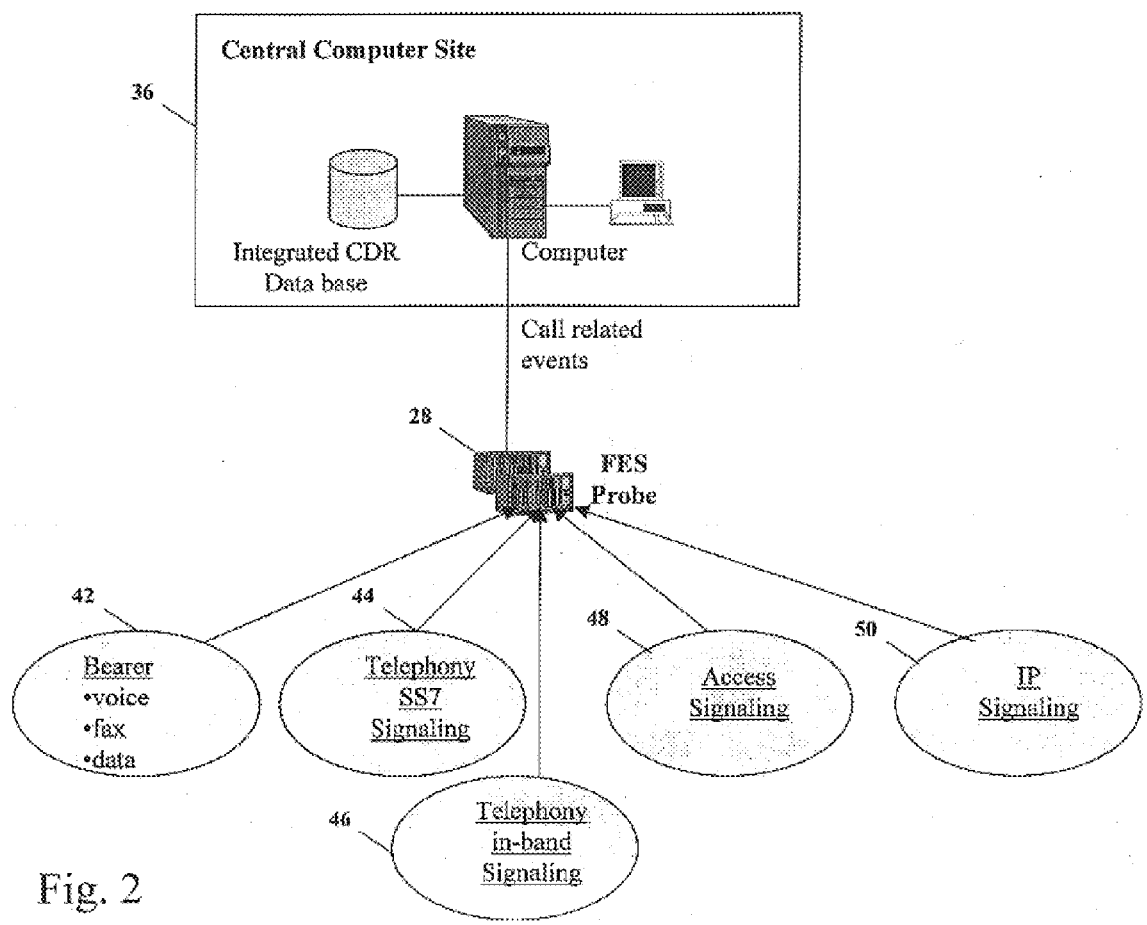
FIG. 2 schematically illustrates various data sources which can be used in the system and method according to the invention for creating integrated CDRs.

FIG. 2 clarifies which data sources can be used by the system according to the invention by schematically illustrating a number of exemplary data sources: 42 is a bearer (signal) source, 44 is a signaling data source provided by a signaling network widely known as SS7, 46 is a telephony in-band signaling transmitted through the telecommunications path together with a bearer signal, 48 is access signaling and 50 is IP signaling used in Internet Protocol networks.

Figure 3:
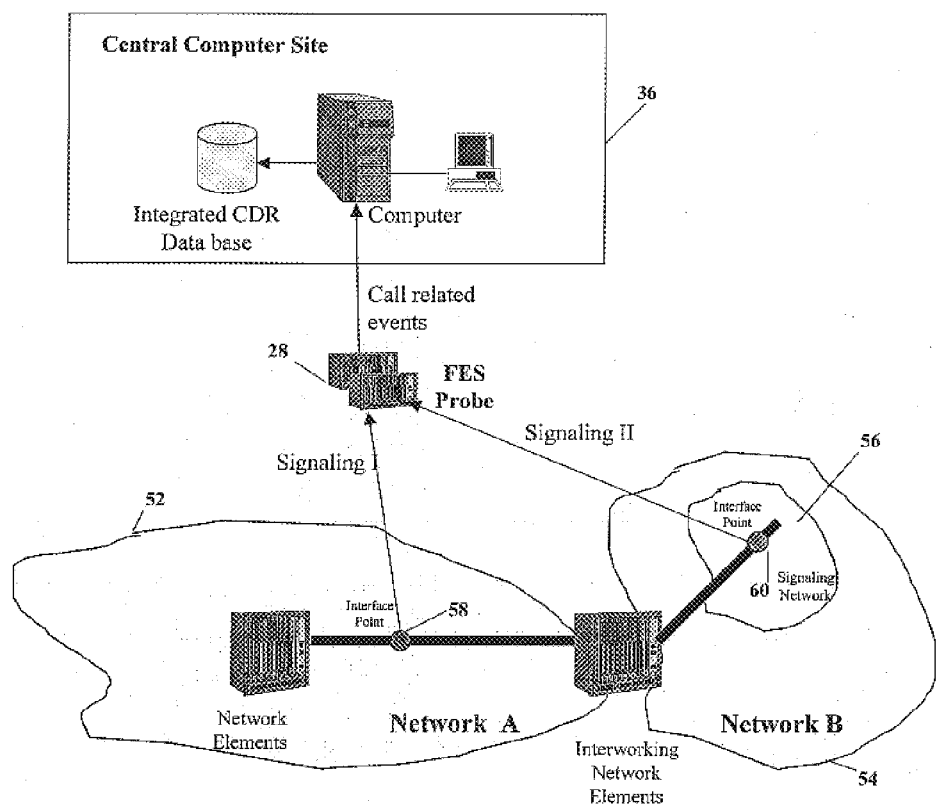
FIG. 3 is pictorial representation of a modification of the system illustrated in FIG. 1, wherein a single FES is shown as cooperating with two sources of data, both being signaling data sources.

FIG. 3 illustrates one exemplary and elementary modification of the system shown in FIG. 1. In this embodiment, a single FES 28 probe is shown, collecting input data from two data sources; in this example, both data sources are signaling data sources. In network A (marked 52) signaling is provided in-band, and in network B (marked 54) it is performed out-of band, by a signaling network marked 56 (for example, SS7). The probe 28 is interfaced via two interface points 58 and 60 to different data sources (i.e. having different protocols) and is capable of processing the input information in the way to obtain call related events suitable for being processed and recorded in the integrated CDR to identify a particular call.

The following examples illustrate some implementations of the system for building real-time Integrated CDR.

Figure 4:
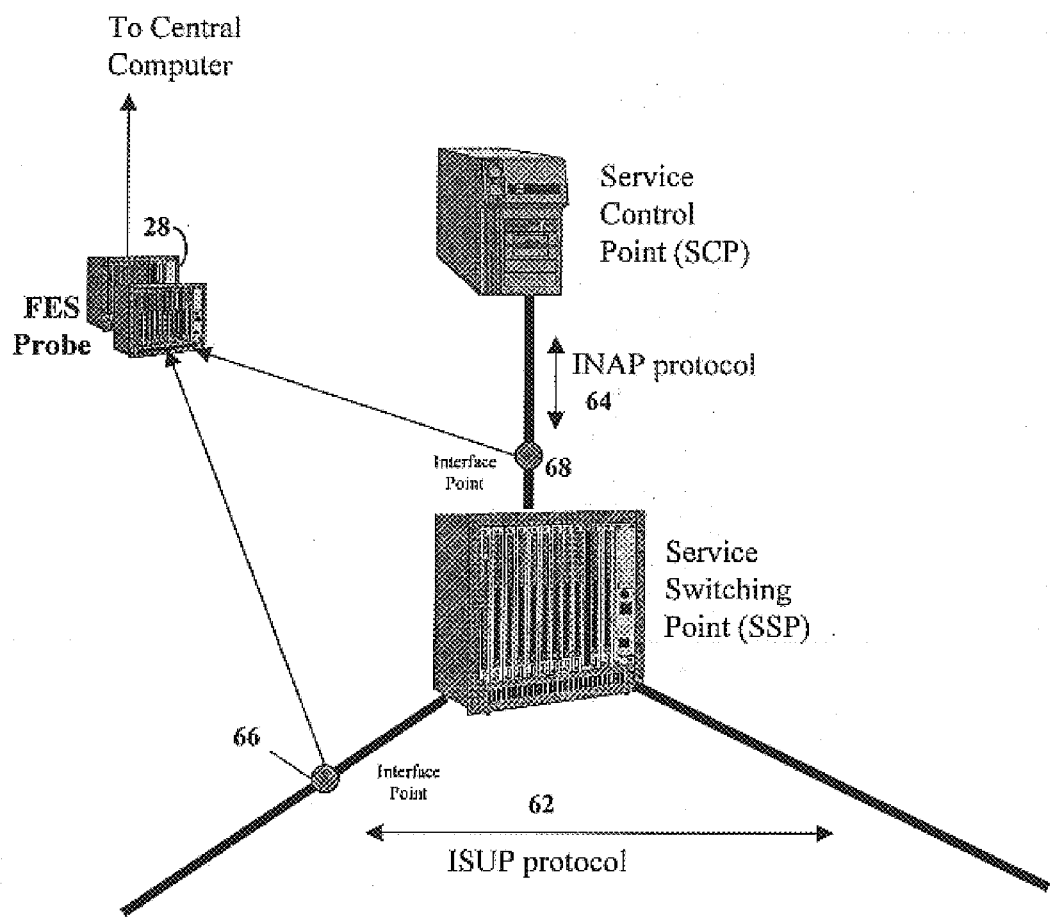
FIG. 4 is pictorial representation of the inventive system applied to an Intelligent Network Call.

FIG. 4 illustrates a so-called Intelligent Network Call. Signaling for such a call is handled in two planes: a basic call (or transport) plane 62 and an IN (Intelligent Network) or service plane 64. In the basic call plane 62 the call is treated by a signaling protocol ISUP (i.e., ISDN user part). In the IN plane 64 it is handled by signaling protocol INAP (Intelligent Network Application Protocol). The both mentioned protocols are utilizing the SS7 signaling stack. Interface point 66 connected to the FES 28 and located at the basic call plane 62 provides data related to the "transport" part of the call. Interface point 68 connected to the FES 28 and situated at the IN plane 64 provides data related to the "service" part of the call and its attributes. The integrated CDR therefore reflects all call aspects.

Figure 5:
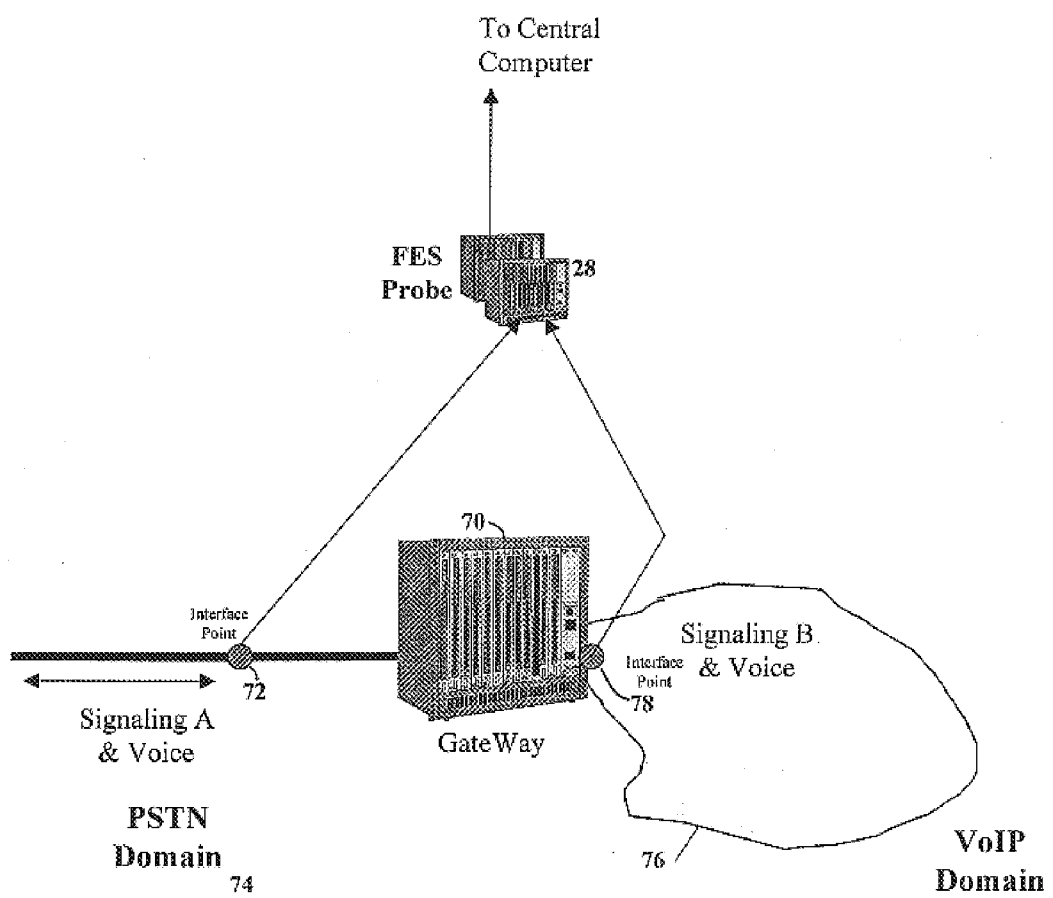
FIG. 5 is pictorial representation of the inventive system applied to the telecommunications network comprising a conventional PSTN network and a Voice over IP network.

FIG. 5 illustrates treatment of a call spanning a regular PSTN telephone network and IP network. Inter-working between PSTN and IP domains for Voice over IP telephone calls originating and/or terminating in the PSTN is a common fact. Signaling for such a call is handled on both sides of an Interworking Gateway Exchange 70. Interface point 72 located at the side of the PSTN domain 74 provides data that might not be available at the side of VoIP domain 76, while the VoIP side of the call includes its own CDR related data and it is obtained by FES 28 via the Interface point 78. Interface Points at both domains provide mutually complementary data related to all aspects of the call.

Figure 6:
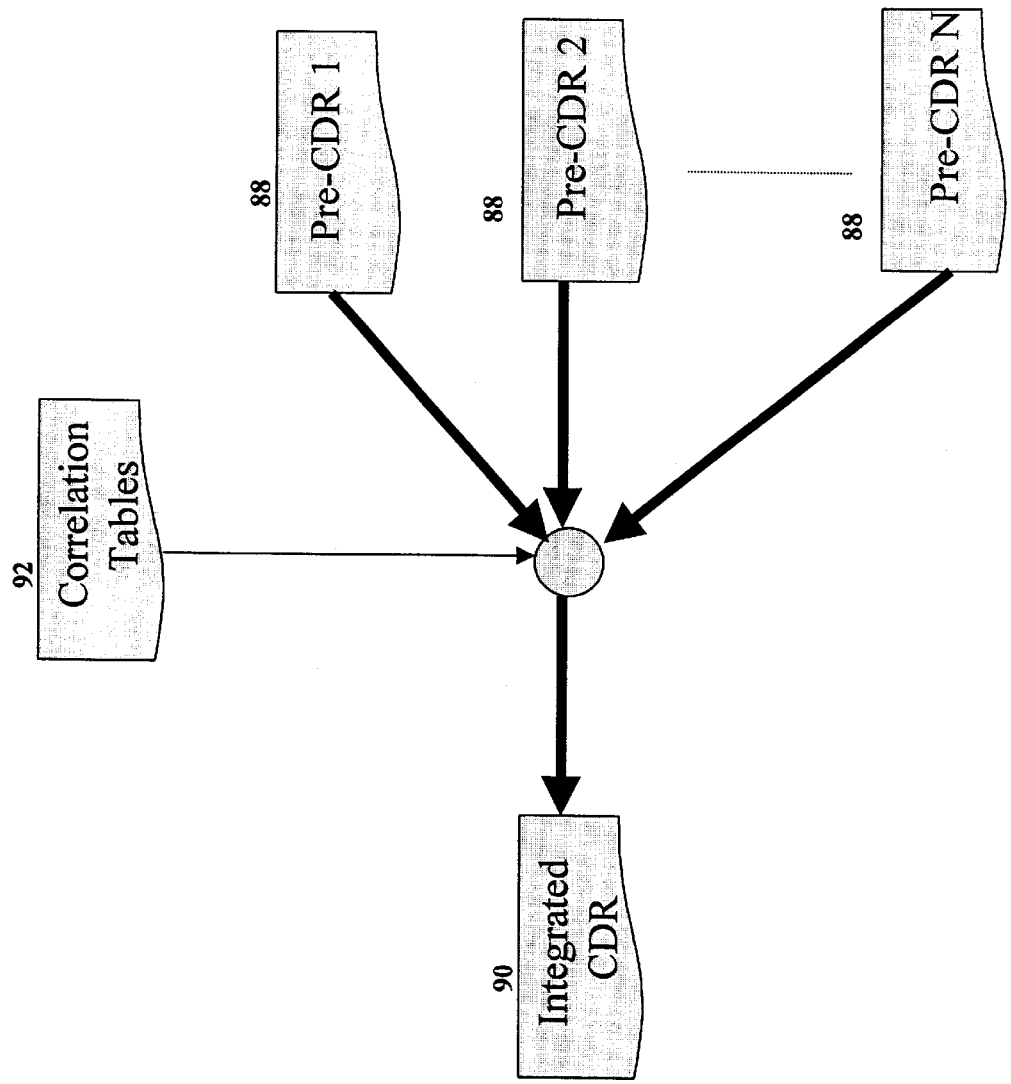
FIG. 6 schematically explains the method according to the invention.

FIG. 6 presents a schematic explanation of the method of the invention, where the processed call related events (illustrated as so-called Pre-CDRs 88 having numbers 1 to N associated to one call instance and obtained from at least two different data sources) are merged into an Integrated CDR 90 using pre-determined rules defined in so-called correlation tables 92.

Figure 7:
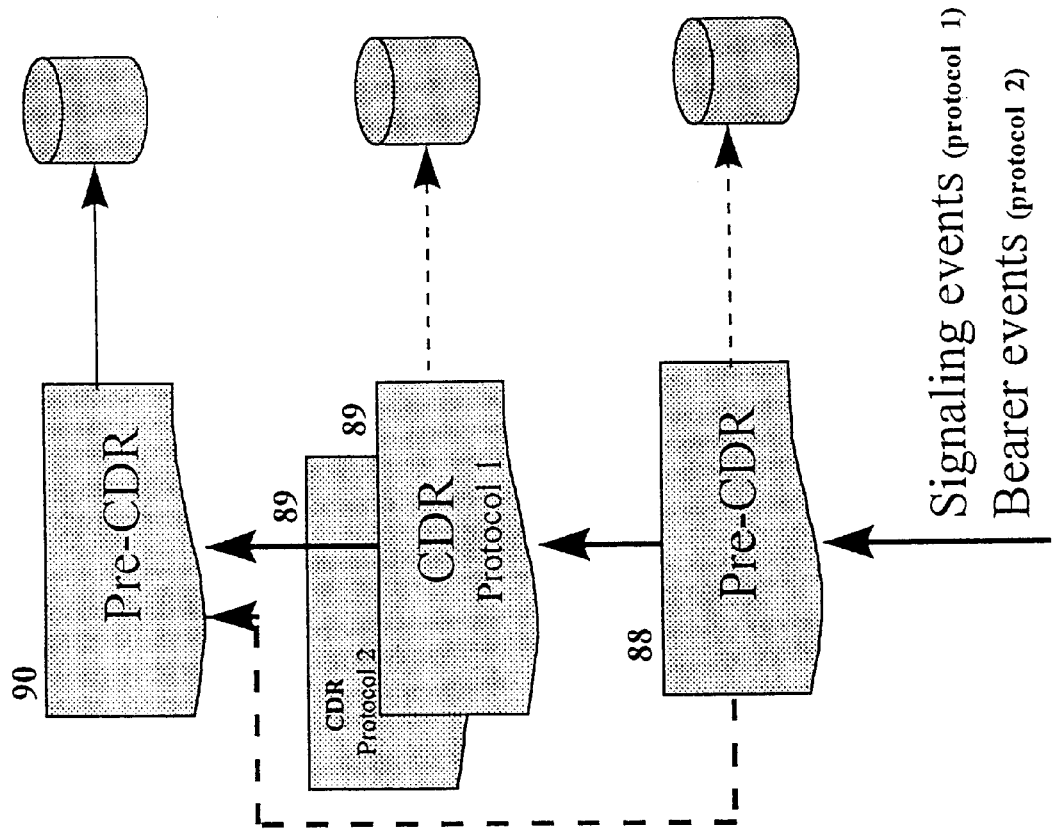
FIG. 7 illustrates the hierarchy of Pre-CDRs, CDRs and integrated CDR.

FIG. 7 illustrates the hierarchy between Pre-CDRs, CDRs and Integrated CDR, drawn for one call instance. Every message extracted from a data source, wherein the data source being either a bearer or a signaling data source, is a Pre-CDR 88 (a bearer classification, a DTMF, signaling messages). A group of Pre-CDRs associated with a specific telecommunication protocol forms a CDR 89, representing data obtained with respect to the call from one network, utilizing one telecommunication protocol. Integrated CDR 90 comprises complete data on the particular call, obtained from the network and using a number of telecommunication protocols. The integrated CDR 90 is usually built from more than one CDRs 89 and optionally from one or more Pre-CDRs 88.

Figure 8A:
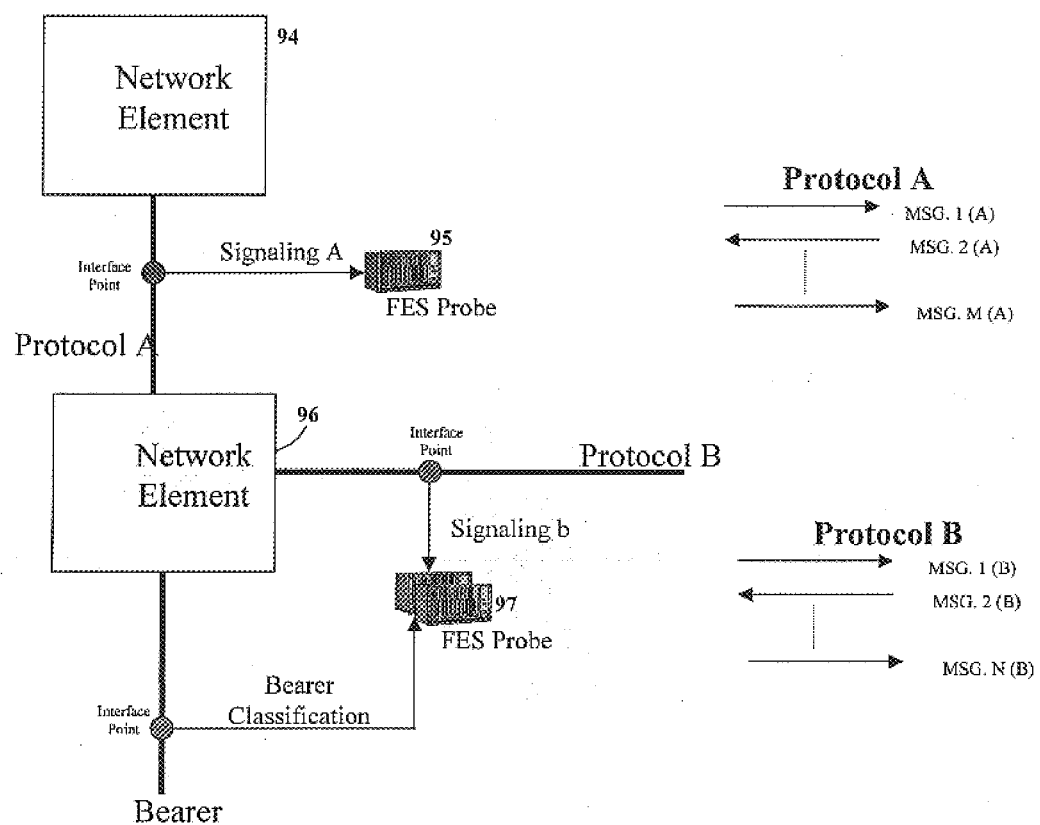
FIGS. 8a and 8b illustrate an example of obtaining input information concerning one call instance from three data sources, and forming an integrated CDR.
Figure 8B:
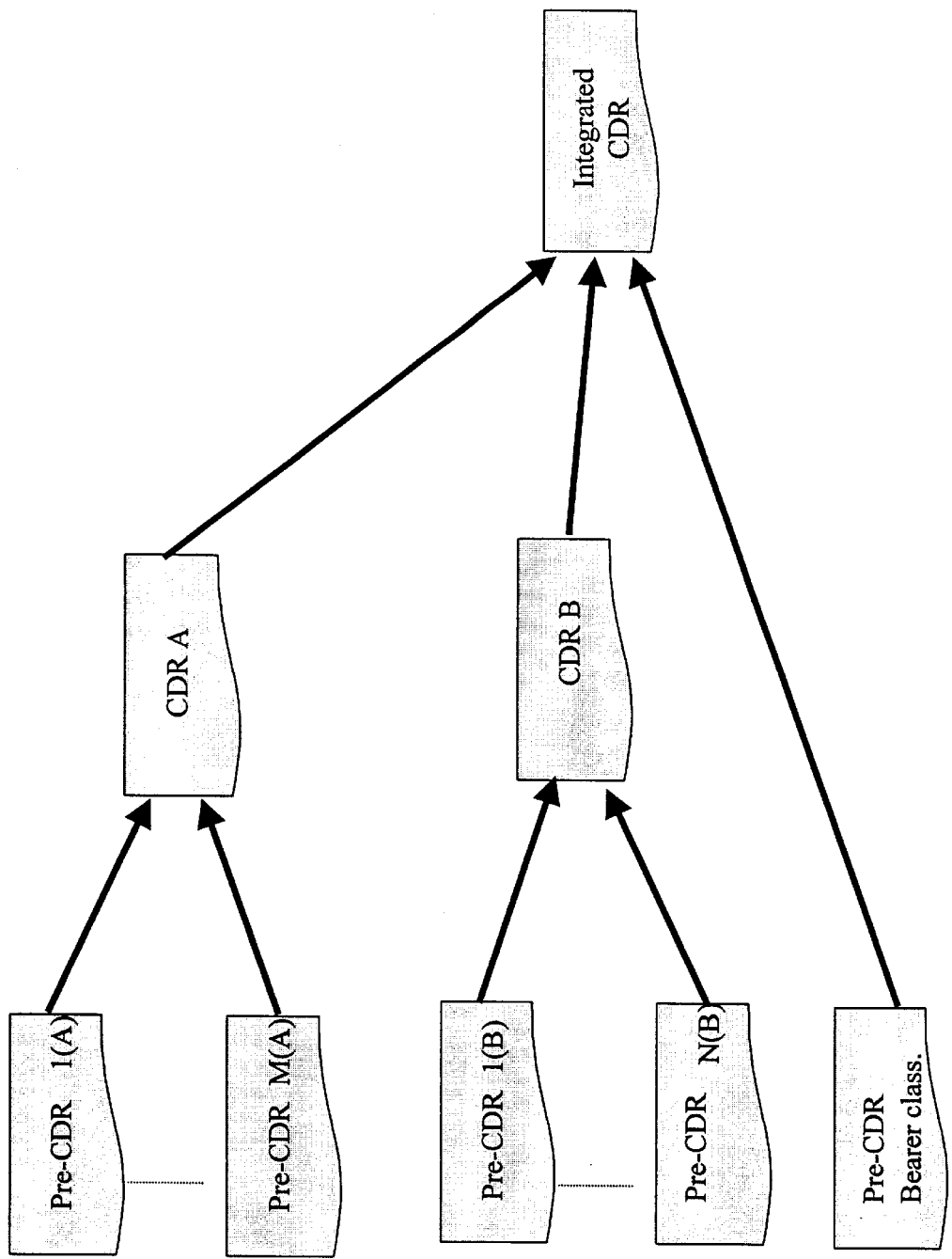

FIGS. 8a and 8b illustrate an example of obtaining input information concerning one call instance from three data sources and forming an integrated CDR. A network element 94 (for example, a computer) is linked to a network element 96 (for example, an exchange). Signaling protocol on the link is Protocol A, for example the Intelligent Network Application Protocol INAP. Probe 95 perceives signaling A from the link and finds therein call related events in the form of signaling messages MSG 1(A) to MSG M(A). The messages, for example, advice that the call is sent, received, etc. The network element 96 governs in its associated network a signaling protocol B, for example ISUP (ISDN user part). Probe(s) 97 is responsible for obtaining input information from the signaling source B, and also from a particular bearer source outgoing from the exchange 96. Call related events determined by the probe(s) 97 will be, for example, the bearer classification and N signaling messages according to protocol B. As has been stated before, the call related events form respective Pre-CDRs. FIG. 8b illustrates how the Pre-CDRs corresponding to the detected call related events are used for the two-stage forming of Integrated CDR, with respect to one particular call instance.

Figure 9:
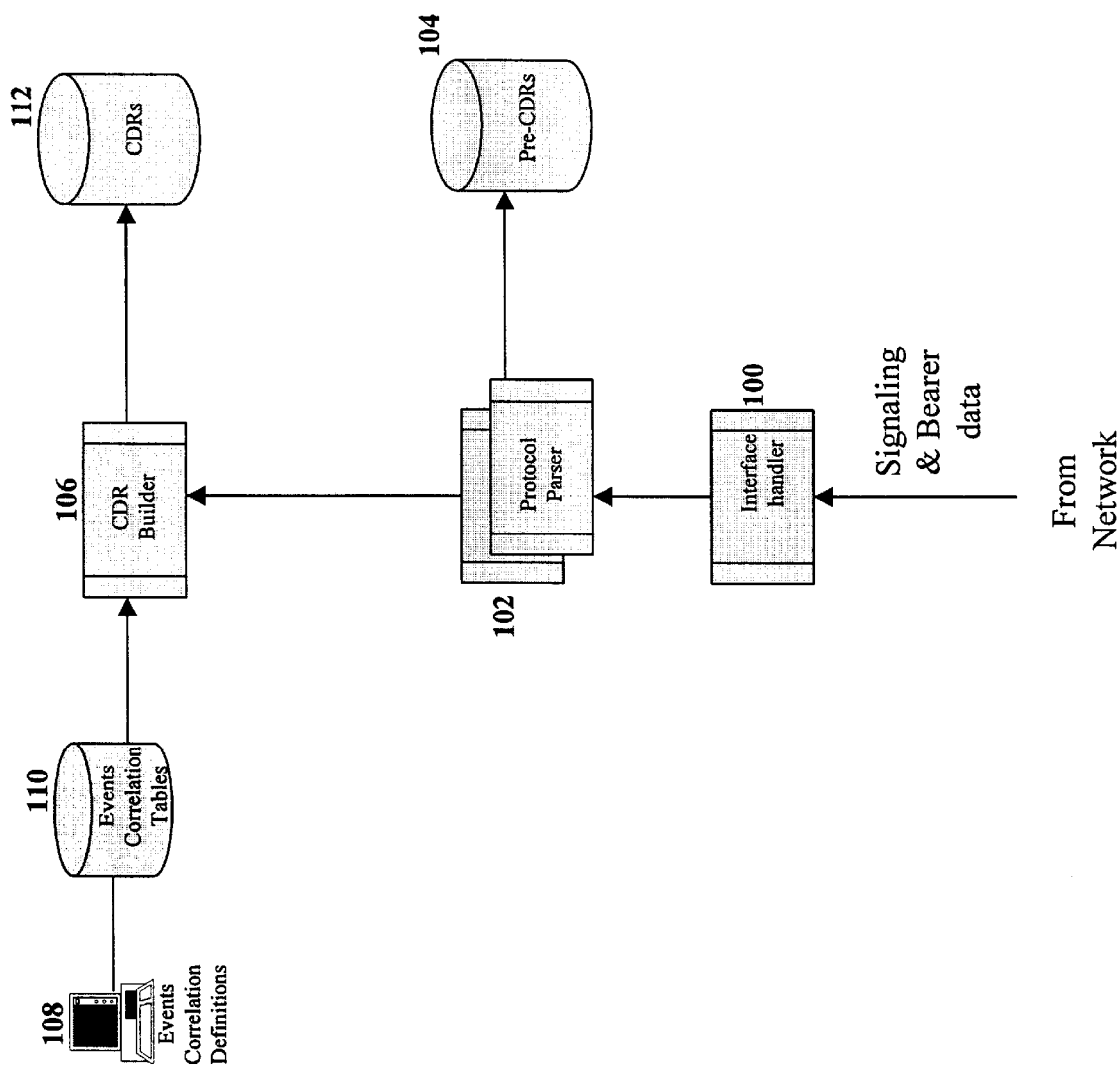
FIG. 9 is pictorial representation of an exemplary structure of the computer means of the system according to the invention.

FIG. 9 explains the basic method in more details by illustrating the computer means of the system according to the invention. As has been mentioned above, the computerized means includes the central computer site equipment and at least partially covers hardware and software modules of FES probes. The real-time generation of an Integrated CDR starts by collecting signaling and bearer data from one or more network's Interface Points. Specific Interface Handlers cater for variety of interfaces mapped to different Links in different Networks. Input information in the form of signaling and bearer data is received and processed by a single Interface handler 100 suitable for the Interface point in use.

Protocol Parsers 102 process a variety of signaling protocols interfaced by the Front End System Probes (not shown). Each Protocol Parser handles a single protocol type. The process of combined processing the input information obtained from different data sources but concerning the same call yields the comprehensive Pre-CDRs (call related events) which can optionally be stored for later processing in a memory means 104.

The Pre-CDRs are transmitted to and further handled by a CDR Builder 106 which is responsible for generating CDRs and Integrated CDRs. As explained above, a CDR may be created for the call related events obtained from one particular data source (i.e. related to one protocol). Generation of CDRs and Integrated CDRs is performed according to Events Correlation Definitions 108 stored in a database of correlation tables 110 which indicates to the CDR Builder 106 which events should be integrated into CDRs and unique Integrated CDRs. Integrated CDRs can be created by the CDR builder either directly, or indirectly, e.g., based on a number of CDRs and additionally integrated Pre-CDRs. A memory means 112 interacts with the CDR builder 106 while storing pre-CDRs, creating CDRs therefrom and storing the created CDRs, and finally creating and storing the Integrated CDR for the call instance. The Definitions 108 are pre-selected rules which determine the association or linkage between various call related events, for example non-redundant merging the events using such parameters related to a call, as origin and destination identifications, time stamp, duration of the call, link/trunk ID, bearer type, etc. Definitions can be manually or automatically entered in the computer memory.

Whilst the invention has been described with particular reference to some preferred embodiments, it should be appreciated that modifications will be apparent to those skilled in the art and the invention contemplates such modifications as fall within the scope of the appended claims.

What is claimed is:

1. A method for building an Integrated Call Detail records data base in a telecommunications network in real time, comprising the steps of:

collecting input information concerning a particular call from two or more data sources wherein at least one of said data sources is a source of signaling data and at least another of said data sources is a non-signaling bearer source of non-signaling data, said input information comprising call related events; and merging said call related events and recording the merged events concerning the particular call in real time, thereby forming the Integrated Call Detail Records data base.

2. The method according to claim 1, wherein said at least two sources of information are situated at different Interface Points of the communication network.

3. The method according to claim 1, wherein said telecommunications network comprises a number of component networks and said sources of information are situated at different said component networks.

4. The method according to claim 1, wherein the step of collecting the input information comprises picking out said call related events therefrom.

5. The method according to claim 4, wherein said picking out is accomplished as follows:

processing the input information by a plurality of Interface Handlers (IH), capable of handling a variety of interfaces in said telecommunications network;

applying a plurality of Protocol Parsers (PP) capable of handling a variety of protocols, wherein each said Protocol Parser handles a single protocol type.

6. The method according to claim 4, further comprising a step of storing the picked out call related events (Pre-CDRs) for further processing.

7. The method according to claim 1, wherein the step of merging and recording is performed in two stages:
   a) forming one or more CDR databases (CDRs), using for each of said CDRs the call related events associated with one telecommunication protocol,
   b) forming an Integrated CDR from said one or more CDRs obtained at step (a) and from remaining call related events associated with the same particular call.

8. The method according to claim 7, wherein steps (a) and (b) are performed by generating said CDRs and Integrated CDRs from said Pre-CDRs by a CDR builder, based on pre-defined rules.

9. The method according to claim 1, wherein said source of signaling data is associated with said bearer.

10. A system for building an Integrated Call Detail records data base in a telecommunications network in real time, comprising:
   at least one probe capable of collecting input information, concerning a particular call, from two or more data sources wherein at least one of said data sources is a source of signaling data and at least another of said data sources is a non-signaling bearer source of non-signaling data, said probe being capable of picking out call related events from said input information; and
   computerized means connected to said at least one probe and adapted to merge said call related events and record the merged events concerning the particular call in real time, thereby creating the Integrated Call Detail Records data base.

11. The system according to claim 10, wherein said at least two sources of information are situated at different Interface Points of the communication network.

12. The system according to claim 10, wherein said telecommunications network comprises a number of component networks, and said sources of information are situated at different said component networks.

13. The system according to claim 10, wherein said probe is a Front End System (FES) probe capable of non-intrusive collecting said input information from at least one data source.

14. The system according to claim 13, wherein said FES probe is TRP-360 of ECTel® Ltd., Israel.

15. The system according to claim 10, wherein said computerized means is operative to effect a two-step processing of the call related events:
   a) forming one or more CDR databases, using for each of said CDR databases the call related events associated with one telecommunication protocol,
   b) forming an Integrated CDR from said one or more CDRs obtained at step (a) and from remaining call related events associated with the same particular call.

16. The system according to claim 1, wherein said computerized means includes a processor and a memory means provided with:
   a plurality of Interface Handlers (IH), capable of handling a variety of interfaces;
   a plurality of Protocol Parsers (PP) capable of processing a variety of signaling protocols, wherein each said Protocol Parser handles a single protocol type; said IH and PP being capable of processing the input information and producing said call related events;
   a CDR builder provided with correlation tables and capable of generating CDRs and Integrated CDRs from said call related events (Pre-CDRs), based on pre-defined rules stored in the correlation tables.

17. The system according to claim 10, wherein said source of signaling data is associated with said bearer.

18. A method for building an Integrated Call Detail Records data base in a telecommunications network in real time, comprising the steps of:
   (a) applying a first probe to a telecommunications bearer network and extracting call related events concerning a particular call therefrom;
   (b) applying a second probe to a telecommunications signaling network associated with said bearer network and extracting further call related events concerning the particular call therefrom; and
   (c) merging and recording said extracted call related events and further call related events in real time thereby forming the Integrated Call Detail Records data base.

19. The method as claimed in claim 18 wherein step (a) further comprises non-intrusively applying said first probe to the telecommunications bearer network and extracting the call related events concerning the particular call therefrom while said bearer network is in service.

20. The method as claimed in claim 18 wherein step (b) further comprises non-intrusively applying said second probe to the telecommunications signaling network and extracting the further call related events concerning the particular call therefrom while said bearer network is in service.

* * * * *